United States Patent
Sparrow et al.

(10) Patent No.: US 7,668,284 B2
(45) Date of Patent: Feb. 23, 2010

(54) TUBE-IN-TUBE THREADED DASHPOT END PLUG

(75) Inventors: James A. Sparrow, Irmo, SC (US); Yuriy Aleshin, Columbia, SC (US); Garry C. Crabtree, Columbia, SC (US)

(73) Assignee: Westinghouse Electric Co. LLC, Cranberry Township, PA (US)

( * ) Notice: Subject to any disclaimer, the term of this patent is extended or adjusted under 35 U.S.C. 154(b) by 0 days.

(21) Appl. No.: 12/332,662

(22) Filed: Dec. 11, 2008

(65) Prior Publication Data

US 2009/0252281 A1    Oct. 8, 2009

Related U.S. Application Data

(62) Division of application No. 11/583,466, filed on Oct. 18, 2006, now Pat. No. 7,515,674.

(51) Int. Cl.
*G21C 3/32* (2006.01)
(52) U.S. Cl. ............ 376/449; 376/409; 376/225; 376/224; 376/327
(58) Field of Classification Search ............ 376/449, 376/409, 234, 225, 224, 327
See application file for complete search history.

(56) References Cited

U.S. PATENT DOCUMENTS

| 3,943,036 A | 3/1976 | Ziegler |
| 4,229,256 A | 10/1980 | Luetzow |
| 4,637,915 A | 1/1987 | Camden et al. |
| 4,668,469 A | 5/1987 | Widener |
| 4,681,730 A | 7/1987 | Beuneche et al. |
| 4,732,729 A | 3/1988 | Amano et al. |
| 4,738,820 A | 4/1988 | Wilson et al. |
| 4,996,021 A | 2/1991 | Bryan |
| 5,068,083 A | 11/1991 | John, Jr. et al. |
| 5,425,070 A | 6/1995 | Gosnell et al. |
| 6,631,176 B2 | 10/2003 | Nunokawa et al. |
| 6,674,831 B2 | 1/2004 | Yamada et al. |
| 6,738,447 B1 | 5/2004 | Sparrow et al. |

*Primary Examiner*—Rick Palabrica

(57) ABSTRACT

A nuclear fuel assembly having a tube-in-tube control rod guide tube design that incorporates an end plug that extends axially upward to an elevation above the lower most grid where it is sealed at its upper end to the lower end of the control rod guide tube. The guide tube lower end plug has a threaded recess in its upper surface that mates with a corresponding dashpot end plug threaded extension that is formed as an insert in the lower end of the guide tube. A hole formed through the outer wall of the guide tube end plug at the elevation of the lower portion of the recess provides a positive inspection port for assuring the proper seating of the dashpot. A method of manufacture of such a fuel assembly is also disclosed.

5 Claims, 4 Drawing Sheets

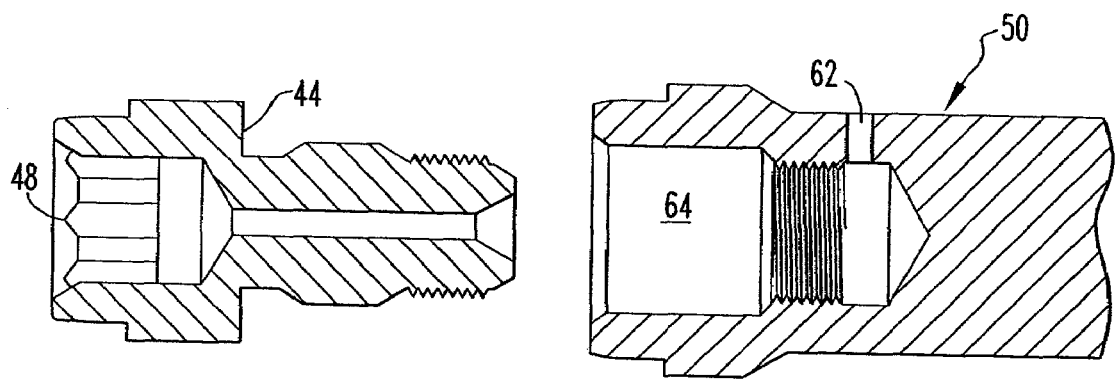
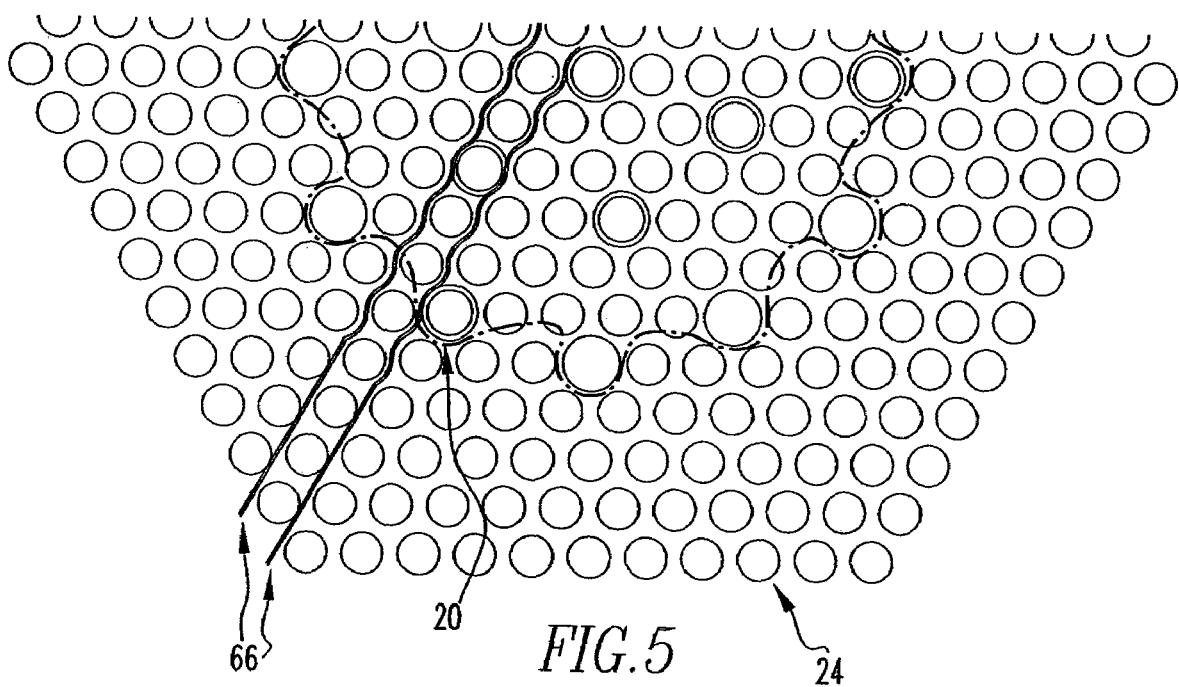

TUBE-IN-TUBE THREADED DASHPOT END PLUG

CROSS REFERENCE TO RELATED APPLICATION

The present application is a divisional application based on U.S. Ser. No. 11/583,466, filed Oct. 18, 2006

BACKGROUND OF THE INVENTION

1. Field of the Invention This invention relates in general to nuclear reactor fuel assemblies and more particularly to control rod guide thimble designs for use within nuclear reactor fuel assemblies.

2. Related Art

In nuclear reactors of the type designed in the former Soviet Union, the reactor core is comprised of a large number of elongated fuel assemblies, each having a plurality of fuel rods held in an organized hexagonal array by a plurality of grids spaced longitudinally along the fuel rods and secured to stainless steel control rod guide thimbles. The stainless steel control rod guide thimbles extend above and below the ends of the fuel rods and are attached to the top and bottom nozzles, respectively. The fuel assemblies are arranged in the reactor vessel with the bottom nozzles resting on a lower core plate. An upper core plate rests on the top nozzles.

The top nozzles in the Soviet design are non-removably fixed to the stainless steel control rod guide thimbles of the fuel assembly. These complex nozzles perform several functions. First, they position the rod control cluster assembly (RCCA) relative to the control rod guide thimbles within the core so the position of the RCCA relative to the upper core plate is fixed. The RCCA positions the control rods, which are inserted into the fuel assembly as a group or cluster.

The Soviet nozzle also dampens the velocity of the control rods using springs to remove energy when the RCCA rods are dropped into the reactor core during an emergency shutdown, commonly known as a "scram". The nozzle also supplies spring loads for supporting the internals. When the upper core plate is lowered onto the nozzles, it compresses the nozzle spring. In addition, the Soviet nozzle is designed to protect the control rods when the fuel assembly is removed from the reactor vessel. Under these conditions, the RCCA is at or below the top edge of the nozzle. Finally, the Soviet design of the top nozzle allows the fuel assembly to be handled when lifted out of the core by transferring the loads through the nozzle.

Thus, the Soviet nozzle is designed to function in two positions, free and compressed. As stainless steel is used for the thimbles of the Soviet fuel assembly, the relative separation between the interior of the reactor vessel and the fuel assemblies remains constant once the assembly is in position. Spring loads are such that the nozzles can support the internals, and the spring loads as well as the RCCA positions are fixed so that all functions are static. As a result, the nozzle has built-in references around which the internals are designed. The stainless steel thimbles used in the Soviet design impose higher reactivity cost on the fuel assemblies due to their neutron capture cross-section, i.e., neutron absorption rate, and they are more difficult to attach to the grids of the fuel assemblies. Non-Soviet fuel assemblies utilize zircaloy for the thimbles which imposes less reactivity cost. However, zircaloy has a different coefficient thermal expansion than the stainless steel reactor vessel, and grows during irradiation. Expandable top nozzles, which accommodate for these variations in the dimensions of the different components within the reactor are disclosed in, for example, U.S. Pat. Nos. 4,534,933; 4,687,619; 4,702,882 and 4,986,959. Such nozzles, however, are used in reactors in which the top core plate rests on a core support in the form of a circular ledge within the reactor vessel. In the Soviet type reactor, the core plate rests on and is supported by the top nozzles.

As mentioned, the Soviet design top nozzle is permanently attached to the thimble tubes of the fuel assembly. The above-mentioned patents disclose removable top nozzles and U.S. Pat. No. 5,479,464 took that technology to another step in applying the removable top nozzles to the Soviet type reactor nozzle design. However, the substitution of zircaloy for stainless steel in some of the fuel assembly components, such as the thimble tubes in which the control rods move, requires further modifications to assure that impact loads experienced by the assemblies can be absorbed without damaging the assemblies or other core components. For example, in the VVER 1000 type Soviet designed reactor, when the control rods scram, they freefall and impact the top nozzle at a very high velocity. This fuel design does not use a dashpot or any other hydraulic mechanical device to minimize these high impacts. In the design described in U.S. Pat. No. 5,479,464, springs are employed to absorb some of this load. However, further means are desired to absorb the shock of the load as well as the load itself. In a standard western fuel assembly design, approximately two feet before full insertion of the control rods into the fuel assembly, the tips of the control rods enter a small diameter portion of the thimble tube called the dashpot. This dashpot is approximately one (1) millimeter larger than the control rods. Because the control rods are moving very fast at this point in the scram, there is a large volume of water which has to be accelerated up past the falling control rods to make room for them in the dashpot. This process causes the control rods to decelerate rapidly, thus lessening the impact velocity of the control rod assembly at the top nozzle adapter plate. The standard VVER 1000 style fuel assemblies do not have a dashpot and therefore the control rod assembly impacts the top nozzle at a much higher velocity. As the kinetic energy is equal to one half the mass× the velocity$^2$, if the velocity at impact on the VVER 1000 fuel design is four times that of the standard western pressurized water reactor design, then the total energy which has to be absorbed after impact is sixteen (16) times as much. A new high energy absorption top nozzle has been designed to absorb that energy and is described in U.S. Pat. No. 6,738,447. This high energy absorption top nozzle assures that the impact loads expected during scram events will be absorbed without damaging the nozzle, fuel assembly and/or control rod assembly. In addition, this new design is expandable to accommodate expansion and growth of the zircaloy components of the fuel assembly while supporting the upper core plate in a fixed position. More recently, the Temelin Unit 1 and 2 reactors of the VVER 1000 type design have experienced some problems associated with incomplete control rod insertions, which raises some safety concerns.

Accordingly, there is a further need for an improved VVER 1000 type of fuel assembly design that will overcome the incomplete control rod insertion problem while accommodating zircaloy clad control rod thimble tubes.

SUMMARY OF THE INVENTION

The aforegoing needs are satisfied by a new nuclear fuel assembly design having a top nozzle, a bottom nozzle and a plurality of elongated thimble tubes having an axial dimension. The thimble tubes are supported in a parallel, spaced array extending axially between the top nozzle and the bottom nozzle. A plurality of spacer grids are arranged in tandem between the top nozzle and the bottom nozzle, supporting the thimble tubes in this parallel array at spaced axial elevations between the top nozzle and the bottom nozzle. A bottom thimble end plug extends axially from the bottom nozzle towards the top nozzle and terminates at a juncture with a lower most portion of a corresponding thimble tube. The lower portion of the bottom thimble end plug is secured to the bottom nozzle. In one preferred embodiment a dashpot, having an outer diameter that closely approximates an interior diameter of the thimble tube, is inserted into the lower portion of the thimble tube. The dashpot includes a lowermost extension having one of either a male or a female mechanically coupling contour that meets with the other of either a male or female mechanically coupling contour in an upper inner surface of the bottom thimble end plug and is secured thereto by the interlocking mechanically coupling contours. Desirably the bottom thimble end plug is provided with a hole through its wall at an elevation proximate an end of the lower most extension of the dashpot that provides a view of the portion of the end of the dashpot lower most extension to confirm the proper seating of the dashpot within the control rod thimble tube.

In one preferred embodiment the bottom thimble end plug extends axially from the bottom nozzle towards the top nozzle and substantially terminates at a juncture with a lower most portion of the thimble tube, above a lower most spacer grid. Desirably the outside diameter of the bottom thimble end plug is not substantially larger than a diameter of the fuel rods at an axial elevation where the fuel rods are ultrasonically inspected, to provide clearance for a substantially rigid ultrasonic probe to be inserted straight through the fuel assembly.

In one embodiment the male and female mechanically coupling contours of the thimble tube end plug and dashpot extension are threaded contours. Preferably, the dashpot extension includes a male thread and the upper inner surface of the thimble tube end plug includes a recess including a mating female thread. Desirably the lead portion of the lower most dashpot extension has a substantially smooth walled beveled pilot that protects the mechanically coupling contours during insertion of the lower most extension into the thimble end plug recess.

The invention further provides a method of manufacturing a fuel element skeleton having a top nozzle, a bottom nozzle, and a plurality of thimble tubes having an axial dimension. The thimble tubes are supported in a spaced parallel array extending axially between the top nozzle and the bottom nozzle. A plurality of spacer grids are arranged in tandem between the top nozzle and the bottom nozzle to support the thimble tubes in the spaced parallel array at spaced axial elevations between the top nozzle and the bottom nozzle. A bottom thimble end plug extending axially from the bottom nozzle towards the top nozzle, substantially terminates at a juncture with the lower most portion of a corresponding thimble tube. The bottom thimble end plug upper surface has a recess in an upper end proximate the juncture of the lower most portion of the corresponding thimble tube. The recess in the upper surface of the thimble end plug has one of either a female or male mechanically coupling contour. The thimble tube in its lower end includes a dashpot within its interior having an outer diameter that closely approximates an interior diameter of the thimble tube. The dashpot includes a lower most extension with the other of either the male or female mechanically coupling contour that mates with the mechanically coupling contour in the recess in the upper end of the thimble end plug. The method includes the step of setting up a plurality of components comprising the top nozzle, bottom nozzle, thimble tubes with the bottom thimble end plug affixed, and the spacer grids in a manufacturing fixture that positions each of the components in the fuel assembly skeleton. The bottom nozzle is then attached to the bottom thimble end plug employing a standard manufacturing screw. A bulging tool is inserted into the top of the thimble tube and lowered to an elevation of the lower most grid above the elevation of the thimble end plug. The bulging tool is expanded to press fit the thimble tube to the lower most grid. The bulging tool is then removed from the thimble tube and the dashpot is inserted into the thimble tube and manipulated to engage the female and male mechanically coupling contours in the thimble tube end plug recess. The bulging tool is again reinserted and expanded to press fit the dashpot to a lower section of the thimble tube and the thimble tube to the plurality of spacer grids at the several elevations above the lower most grid. The bulging tool is then removed and the components, now assembled are removed from the manufacturing fixture. In the preferred embodiment a hole is provided in a wall of the bottom thimble end plug at an elevation where the dashpot seats in the bottom thimble end plug and includes the step of viewing the seating of the dashpot end plug to ensure its proper engagement.

BRIEF DESCRIPTION OF THE DRAWINGS

A further understanding of the invention can be gained from the following description of the preferred embodiments when read in conjunction with the accompanying drawings in which:

FIG. 4 is a schematic illustration of the dashpot end plug being remotely aligned and inserted into the recess in the upper surface of the control rod guide tube lower end cap; and FIG. 5 is a schematic cross section illustrating the relative half pattern of control rods and fuel rods within an exemplary fuel assembly.

DESCRIPTION OF THE PREFERRED EMBODIMENTS

Figure 1:
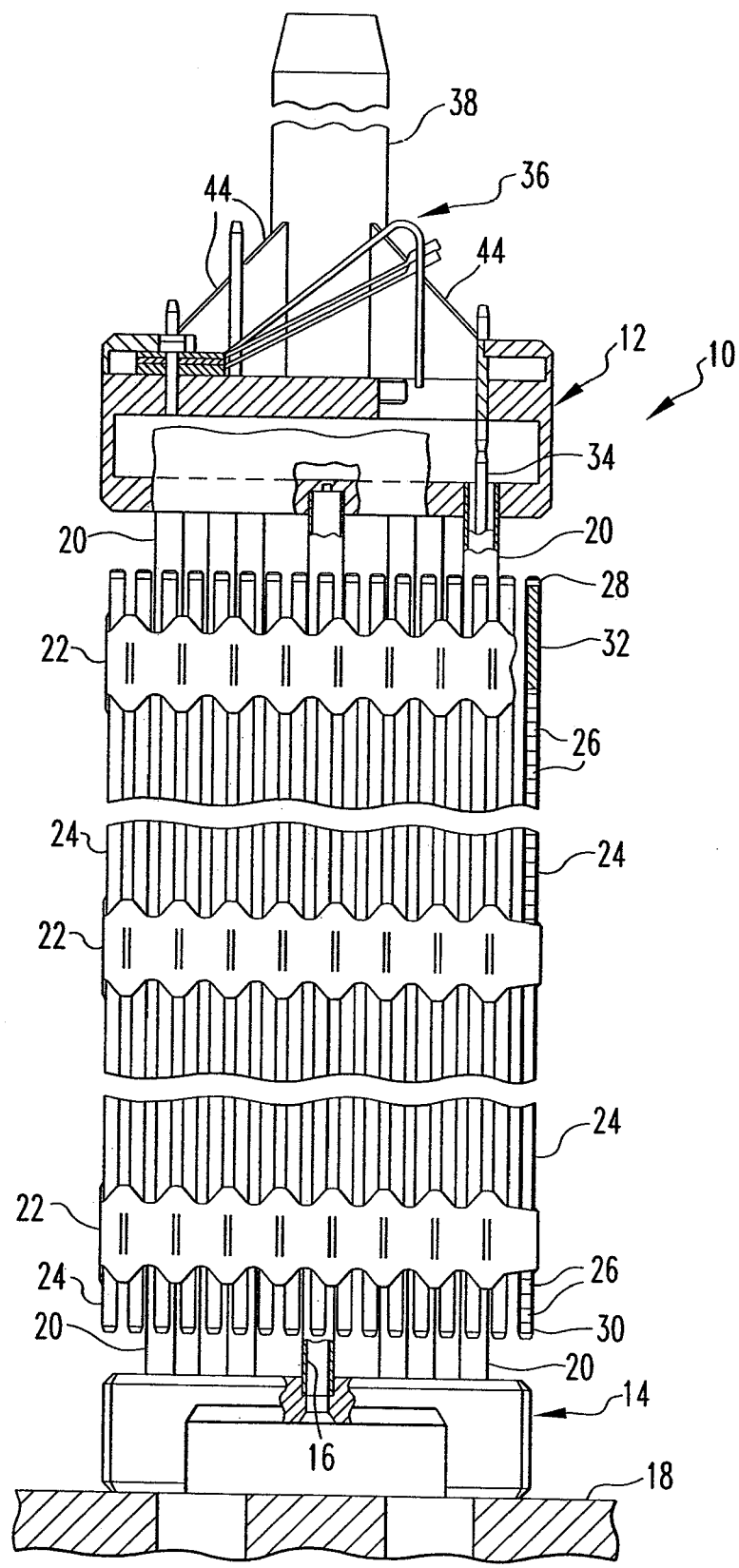
FIG. 1 is a planned view partially in section of a rectangular fuel assembly with guide thimbles that can incorporate the design of this invention.

FIG. 1 illustrates a typical nuclear fuel assembly 10 for a pressurized water reactor that can employ the control rod guide thimbles of this invention to slow down the control rods when they are dropped into the reactor core under a scram condition. FIG. 1 shows an elevational view of a nuclear reactor fuel assembly, represented in vertically shorten form and being generally designated by reference character 10. The fuel assembly 10 has a structural skeleton which, at its lower end includes the bottom nozzle 14. The bottom nozzle 14 supports the fuel assembly 10 on a lower core support plate 18 in the core region of the nuclear reactor (not shown). In addition to the bottom nozzle 14, the structural skeleton of the fuel assembly 10 also includes a top nozzle 12 at its upper end and a number of guide tubes or thimbles 20, which extend longitudinally between the bottom and top nozzles 14 and 12 and at the opposite ends are rigidly attached thereto.

The structural skeleton of the fuel assembly 10 further includes a plurality of traverse grids 22, that are axially spaced along, and mounted to, the guide thimble tubes 20. In the final assembly the grids function to maintain an organized array of elongated fuel rods 24 traversely spaced and supported by the grids 22. Also, the structural skeleton of the fuel assembly 10 includes an instrumentation tube 16 located in the center thereof, which extends and is captured between the bottom and top nozzles 14 and 12. With such an arrangement of parts, fuel assembly 20 forms an integral unit capable of being conveniently handled without damaging the assembled parts.

Figure 2:
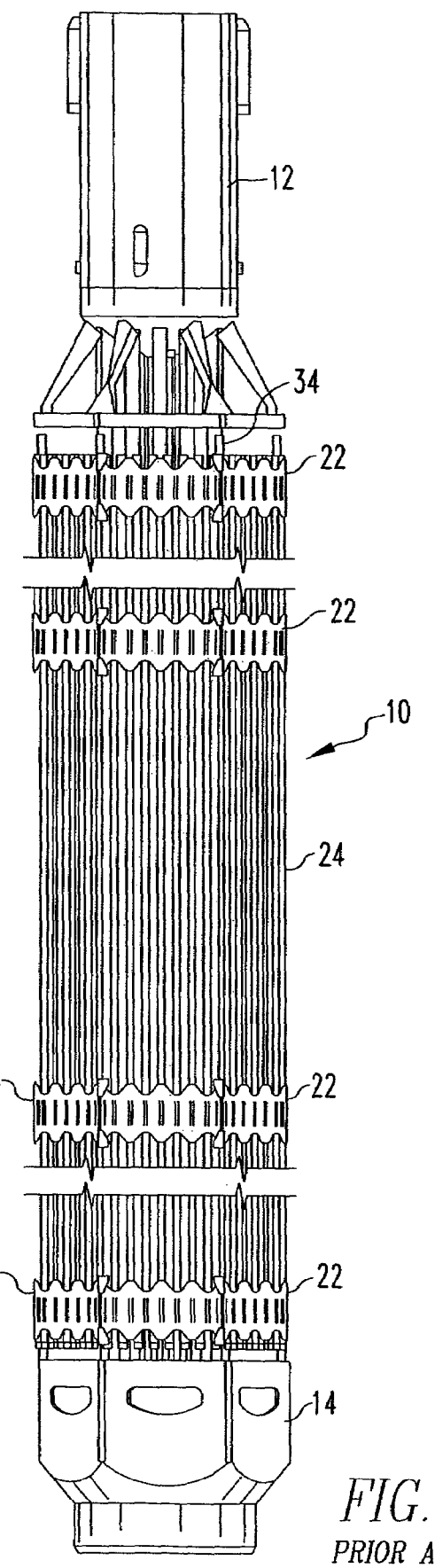
FIG. 2 is a planned view of a hexagonal fuel assembly with guide thimbles that can incorporate the design of this invention.

The fuel rods 24 are not actually part of the structural skeleton of the fuel assembly 10, but are inserted, respectively, in the individual cells within the grids 22 before the top nozzle is finally affixed at the end of fuel assembly manufacture. As mentioned above, the fuel rods 24, as in the array shown in the fuel assembly 10, are held in space relationship with one another by the grids 22 spaced in tandem along the fuel assembly length. Each fuel rod 24 includes a stack of nuclear fuel pellets 26 and is closed at its opposite ends by upper and lower fuel rod end plugs 28 and 30. The pellets 26 are maintained in the stack by plenum spring 32 disposed between the upper end plug 28 and the top of the pellet stack. The fuel pellets 26, composed of fissile material, are responsible for creating the thermal power of the reactor. A liquid moderator/coolant such as water or water containing boron, is pumped upwardly through a plurality of flow openings in the lower core support plate 18 to the fuel assembly 10. The bottom nozzle 14 of the fuel assembly 10 passes the coolant upwardly through the guide tubes 20 and along the fuel rods 24 of the assembly 10 in order to extract heat generated therein for the production of useful work. For the purpose of illustration, FIG. 1 shows a 17×17 array of fuel rods 24 in a square configuration, it should be appreciated that other arrays of different designs and geometries are employed in various models of pressurized reactors. For example VVER fuel assembly is formed in a hexagonal array as shown in FIG. 2, however, the basic components of the structural skeleton are the same as that illustrated in FIG. 1. Like reference characters are employed to identify corresponding components shown in FIG. 1 and FIG. 2.

To control the fission process, a number of control rods 34 are reciprocally movable in the guide thimbles 20 located at predetermined positions in the fuel assembly 10. A rod cluster control mechanism 36 positioned above the top nozzle 12 supports the control rod 34. The control mechanism has an internally threaded cylindrical member 38 which functions as a drive rod with, a plurality of radial extending flukes or arms 40. Each arm 40 is interconnected to a control rod 34 such that the control rod mechanism 36 is operable to move the control rods vertically in the guide thimbles 20 to thereby control the fission process in the fuel assembly 10, all in a well known manner.

The grids 22 are mechanically attached to the control rod guide thimbles 20 and the instrumentation tube 16 by welding, or preferably by bulging. Bulging is particularly desirable where welding dissimilar materials is difficult.

Figure 3:
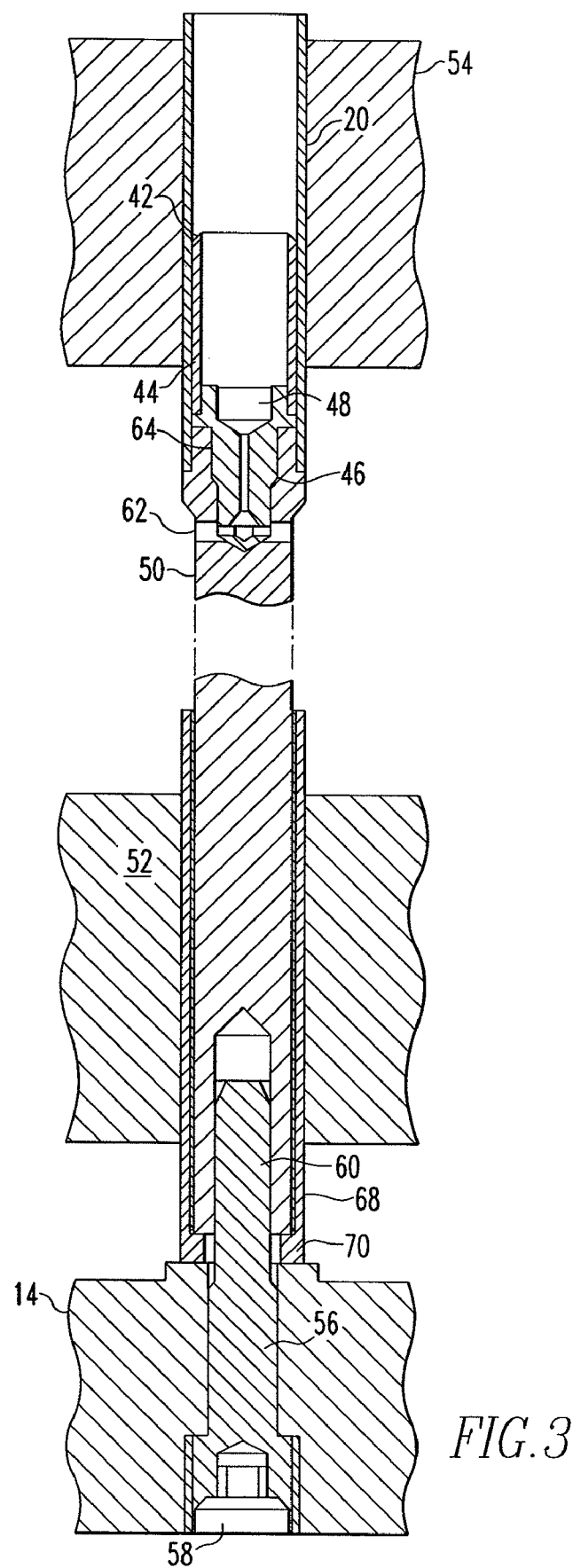
FIG. 3 is a planned view partially in section of a guide thimble design of this invention.

FIG. 3 is a planned view of the lower portion of a control rod guide thimble tube 20 which is closed at its lower end by an extended guide thimble end plug 50. The guide thimble end plug 50 is attached to the bottom nozzle 14 by a threaded thimble screw 56 which is inserted through a bore 58 that is countersunk in the bottom nozzle 14. The thimble screw 56 attaches to a threaded recess 60 in the lower end of the guide thimble end plug 50. The lower most grid 52 has a sleeve insert 68, through which the control rod thimble end plug passes. The sleeve insert 68 is affixed to the grid straps by welding or brazing and has an inner annular lip 70 at its lower end that is captured between the control rod thimble end plug 50 and the bottom nozzle 14 by the bottom nozzle thimble screw 56 and supports the lower grid in position. The upper portion of the guide thimble end plug 50 is attached to the lower end of the guide thimble tube 20 and includes a partially threaded recess 64 in its upper surface. Furthermore, in accordance with this invention, the lower portion of the interior of the guide thimble tube 20 is narrowed by a dashpot insert tube 44 that has a tapered extended end 46 that is threaded in an upper portion of the extension to mate with corresponding threads in the guide thimble end plug recess 64. The lower extension 46 of the dashpot 42 further includes a chamfered smooth lower end that's used to remotely guide the extended end 46 of the dashpot tube 42 into the recess 64. A hex key contoured inner surface 48 within the interior of the lower extension 46 of the dashpot tube 42 is provided to aid in manufacture as will be explained hereafter. One or more inspection ports 62 are provided within the side of the guide thimble tube end plug 50 at the elevation 62 where the dashpot end plug 44 seats in the recess 64 to assure the proper positioning of the dashpot end plug during manufacture. The second lower most grid surrounding the dashpot 54 is fasten to the thimble tube 20 by bugling.

After irradiation if a fuel assembly is known to have leaking fuel it is desirable to ultrasonic nondestructively inspect all of the fuel rods to determine which fuel rod may be leaking. To accomplish this inspection ultrasonic probes are inserted through the rows of fuel rods and control rod guide thimbles to inspect each of the rods. This is accomplished at an elevation along the fuel assembly just above the lower most grid. However, to accommodate the width of the control rods and provide adequate clearance between the inner walls of the dashpot 42 the outer diameter of the thimble tube walls 20 will necessarily have to be larger than the width of the fuel rods and will inhibit the insertion of the ultrasonic probes. Reference character 66 in FIG. 5 figuratively illustrates the circuitous path the ultrasonic probes would have to follow if the control rod thimbles extend to the elevation of the lower most grid. To overcome this obstacle the guide thimble end plug 50 has been designed to have an extended axial dimension that terminates just below the second lower most grid 54. The guide thimble end plug 50 has a width only slightly larger than the fuel rods 24 and thus enables passage of the ultrasonic probes through the rows of fuel rods for the nondestructive examination process to proceed.

The tube-in-tube dashpot design of this invention enables an improved manufacturing process that reduces the number of manufacturing steps required, avoids potential manufacturing errors and enables reduction of scrap rates and ease of assembly.

Previously, the manufacturing process required the set up of all components in a skeleton fixture. Next, special type one (1) manufacturing screws attached the bottom nozzle 14 to the skeleton thimbles 20. A bulging tool was then inserted all the way to the bottom of the skeleton and the bottom grid 52 was bulged in its location. The bulging tooling was then withdrawn from the assembly 10. The type 1 manufacturing screws were then removed and the dashpot assemblies inserted into each thimble 20. Special type two (2) manufacturing screws were then inserted through the bottom nozzle 14 and the bottom end plug 50 of the thimble 20 and into the dashpot end plug and torqued down to form a press fit between the dashpot and the thimble end plug. The bulging tool was then reinserted into the thimbles and the remainder of the bulges were made. The bulging tooling was then withdrawn from the assembly, the type 2 manufacturing screws were removed and a dedicated gauge was inserted through the bottom nozzle into each thimble end plug to measure the gap between the dashpots and thimble end plugs. This spacing cannot exceed a specified value. If the spacing has been exceeded, the skeleton should be scrapped. Standard product thimble screws are then inserted and tightened to the required torque prior to removal of the skeleton from the fixture.

The design of this invention enables a more efficient and cost effective manufacturing process. The set up of all components on the skeleton fixture is still required. However, standard product thimble screws 58 attach the bottom nozzle to the skeleton control rod thimbles. The lower most grid 52 can be attached to the guide thimble end plug 50 by welding. The bulging tool is then inserted all the way to the bottom of the guide thimble tube and the second lower most grid adjacent the lower end of the guide tube 20 is bulged in its location. The bulging tool is then withdrawn from the assembly and the dashpot assembly 42 is then inserted into each thimble and torqued into position. The axial position of the dashpot is viewed/gauged through a small hole 62 in the guide thimble end plug. The bulge tooling is reinserted into the thimbles and the remainder of the bulges are made. The bulge tooling is then removed from the assembly prior to the removal of the skeleton from the fixture.

The dashpot end plug 64 has a broached hex 48 in its top end which allows engagement of a hex wrench for proper torqueing. Although it should be appreciated that other mating tooling configurations can be employed to accomplished the same results. For instance, the hex or other articulated contoured surface can be formed in a raised pedestal on the top surface on the dashpot end plug 64 and mate with a tooling socket having a female recess with a corresponding articulated contoured surface. The threaded end of the dashpot plug 64 has a non threaded pilot chamfered end which protects the threads during insertion and provides for remote insertion into the mating female threads in the recess of the top surface of the guide thimble end plug 50. Appropriate chamfers as shown in FIG. 4, threads and the mating guide thimble end plug recess assure no thread damage during assembly and first time every time proper thread engagement.

The tube-in-tube threaded dashpot end plug provides improvements in the structural capability of the joint and ease of assembly in the manufacturing process as well as decreases the probability of needing rework or even scraping any of the components as the proper dashpot seating is proven before the dashpot is bulged in the skeleton. The number of manufacturing steps eliminated in this design provides a time savings as well as a reduction in the number of errors that can occur during the manufacturing processes.

While specific embodiments of the invention have been described in detail, it will be appreciated by those skilled in the art that various modifications and alternatives to those details can be developed in light of the overall teachings of the disclosure. Accordingly, the particular embodiments disclosed are meant to be illustrative only and not limiting as to the scope of the invention which is to be given the full breath of the appended claims and any and all equivalents thereof.

What is claimed is:

1. A method of manufacturing a fuel element skeleton having a top nozzle, a bottom nozzle, a plurality of elongated thimble tubes having an axial dimension, the thimble tubes being supported in a spaced parallel array extending axially between the top nozzle and the bottom nozzle, a plurality of spacer grids arranged in tandem between the top nozzle and the bottom nozzle, supporting the thimble tubes in the spaced parallel array at spaced axial elevations between the top nozzle and bottom nozzle and a bottom thimble end plug extending axially from the bottom nozzle towards the top nozzle and substantially terminating at a juncture with a lowermost portion of one of the plurality of thimble tubes, wherein the bottom thimble end plug has a recess in an upper end proximate the juncture of the lowermost portion of the one of the plurality of thimble tubes, the recess in the upper end of the thimble end plug having one of either a female or male mechanically coupling contour and further including a dashpot having an outer diameter that closely approximates an interior diameter of the thimble, the dashpot including a lowermost extension with the other of either the male or female mechanically coupling contour that mates with the mechanically coupling contour in the recess in the upper end of the thimble end plug, comprising the steps of:
setting up a plurality of components comprising the top nozzle, bottom nozzle, thimble tubes with the bottom thimble end plug affixed and the spacer grids in a manufacturing fixture that positions each of the components in the fuel assembly skeleton;
attaching the bottom nozzle to the bottom thimble end plug;
inserting a bulging tool into a top of the thimble tube;
lowering the bulging tool within the thimble tube to an elevation of a lower most grid of the plurality of grids above an elevation of the thimble end plug;
expanding the bulging tool to press fit the thimble tube to the lowermost grid;
removing the bulging tool from the thimble tube;
inserting the dashpot into the thimble tube;
manipulating the dashpot to engage the female and male mechanically coupling contours in the thimble end plug recess and dashpot end plug lowermost extension;
inserting the bulging tool within the thimble tool;
expanding the bulging tool to press fit the dashpot to a lower section of the thimble tube and the thimble tube to the plurality of spacer grids above the lowermost grid;
removing the bulging tool from the thimble tube; and
removing the components now assembled from the manufacturing fixture.

2. The method of manufacturing a fuel element skeleton of claim 1 wherein the step of attaching the bottom nozzle to the bottom thimble end plug comprises securing the bottom nozzle to the bottom thimble end plug with a standard product thimble screw.

3. The method of manufacturing a fuel element skeleton of claim 1 wherein the dashpot includes a lower dashpot end plug from which the lowermost extension extends and wherein the manipulating step comprises turning the dashpot end plug so the female and male mechanically coupling contours engage.

4. The method of manufacturing a fuel element skeleton of claim 3 wherein the dashpot end plug has an upper surface with an articulated contour and the turning step comprises engaging the articulated contour on the upper surface of the dashpot end plug with an engagement tool having a mating articulated extension that mates with the articulated contour of the upper surface on the dashpot end plug and using the engagement tool to torque the dashpot end plug in the recess in the thimble end plug.

5. The method of manufacturing a fuel element skeleton of claim 1 including the step of viewing the seating of the dashpot end plug in the recess in the bottom thimble end plug recess through a hole in a wall of the bottom thimble end plug.

\* \* \* \* \*